United States Patent
Moriya et al.

(10) Patent No.: US 11,943,372 B2
(45) Date of Patent: Mar. 26, 2024

(54) USE RIGHT INFORMATION PROCESSING DEVICE, USE RIGHT INFORMATION PROCESSING SYSTEM, AND USE RIGHT INFORMATION PROCESSING METHOD, BASED ON SMART CONTRACT

(71) Applicant: A42 Inc., Tokyo (JP)

(72) Inventors: Hideyoshi Moriya, Tokyo (JP); Hiroyuki Tachibana, Tokyo (JP)

(73) Assignee: A42 Inc., Tokyo (JP)

( * ) Notice: Subject to any disclaimer, the term of this patent is extended or adjusted under 35 U.S.C. 154(b) by 290 days.

(21) Appl. No.: 17/635,879

(22) PCT Filed: Nov. 11, 2020

(86) PCT No.: PCT/JP2020/042051
§ 371 (c)(1),
(2) Date: Feb. 16, 2022

(87) PCT Pub. No.: WO2021/117406
PCT Pub. Date: Jun. 17, 2021

(65) Prior Publication Data
US 2022/0294642 A1    Sep. 15, 2022

(30) Foreign Application Priority Data
Dec. 13, 2019   (JP) .................. 2019-225375

(51) Int. Cl.
*H04L 9/32*     (2006.01)
*H04L 9/00*     (2022.01)
*H04L 9/08*     (2006.01)

(52) U.S. Cl.
CPC .......... *H04L 9/3252* (2013.01); *H04L 9/0825* (2013.01); *H04L 9/3213* (2013.01); *H04L 9/50* (2022.05)

(58) Field of Classification Search
CPC ... H04L 9/3252; H04L 9/0825; H04L 9/3213; H04L 9/50; H04L 63/0807; H04L 9/3247; H04L 63/126; G06F 21/31; G06F 21/60
See application file for complete search history.

(56) References Cited

U.S. PATENT DOCUMENTS 6,073,242 A * 6/2000 Hardy ................. H04L 9/083
                                                              380/258
2018/0191714 A1    7/2018 Jentzsch et al.
(Continued)

FOREIGN PATENT DOCUMENTS

| JP | 6469920 B1 | 2/2019 |
|---|---|---|
| JP | 6511201 B1 | 5/2019 |
| WO | 2018/126059 A1 | 7/2018 |

OTHER PUBLICATIONS

Nayak et al. ("Saranyu: Using Smart Contracts and Blockchain for Cloud Tenant Management", Jul. 2018, IEEE 11th International Conference on Cloud Computing, pp. 857-861 (Year: 2018).*

(Continued)

*Primary Examiner* — Kenneth W Chang
(74) *Attorney, Agent, or Firm* — Young Basile Hanlon & MacFarlane, P.C.

(57) ABSTRACT

A use right information processing apparatus securely manages a use right without using an authentication server and appropriately allowing a valid user to use a device. The apparatus performs processing related to authentication and authorization for a user to use a device to be controlled using a smart contract. The apparatus stores authentication data shared with a user terminal used by the user and having a different value for each process, receives signature data generated in the user terminal by signing the authentication data using a secret key corresponding to the user, derives a public key corresponding to the secret key from the signature data and the authentication data using an elliptic curve (Continued)

digital signature algorithm, and obtains, using the public key or corresponding identification information, information regarding a use right of the device of the user recorded in advance in association with the public key or the identification information.

13 Claims, 6 Drawing Sheets

(56) References Cited

U.S. PATENT DOCUMENTS

| | | |
|---|---|---|
| 2019/0057382 A1 | 2/2019 | Wright et al. |
| 2019/0199535 A1* | 6/2019 | Falk .................... G06F 16/1824 |
| 2019/0251079 A1* | 8/2019 | Yan ........................ G06F 16/27 |
| 2019/0268336 A1* | 8/2019 | Gomi .................. H04W 12/069 |
| 2020/0112442 A1* | 4/2020 | Wentz ................... H04L 9/3297 |

OTHER PUBLICATIONS

Xu et al. ("BlendCAC: A Blockchain-ENabled Decentralized Capability-based Access Control for IoTs", Aug. 2018, IEEE International Conference on Internet of Things, pp. 1027-1034 (Year: 2018).*
Wood, Gavin. "Ethereum: A secure decentralised generalised transaction ledger." Ethereum project yellow paper 151.2014 (2014): 1-32.; <URL: https://ethereum.github.io/yellowpaper/paper.pdf>.

* cited by examiner

| | ADDRESS | USE START TIME | USE END TIME |
|---|---|---|---|
| | X | YYMMDD HH:MM:SS | YYMMDD HH:MM:SS |
| | Y | YYMMDD HH:MM:SS | YYMMDD HH:MM:SS |
| | Z | YYMMDD HH:MM:SS | YYMMDD HH:MM:SS |
| | ... | ... | ... |

USE RIGHT INFORMATION PROCESSING DEVICE, USE RIGHT INFORMATION PROCESSING SYSTEM, AND USE RIGHT INFORMATION PROCESSING METHOD, BASED ON SMART CONTRACT

CROSS-REFERENCE TO RELATED APPLICATION(S)

The present application claims priority to Japanese Patent Application No. 2019-225375 filed on Dec. 13, 2019, the disclosure of which is incorporated herein by reference in its entirety.

TECHNICAL FIELD

The present invention relates to a use right information processing apparatus, a use right information processing system, and a use right information processing method based on a smart contract. More specifically, the present invention relates to a technique that enables management of use rights of services and devices on the basis of electronic signature verification and a state of a smart contract.

BACKGROUND

A blockchain is distributed ledger technology that records data using a method difficult to falsify.

A smart contract is an application example of the blockchain, which is a system that enables data and processing conditions to be managed on a distributed ledger to be defined by a program, in which a predetermined program is executed and data on the distributed ledger is changed according to acquisition of data recorded on the distributed ledger and contents of a transaction stored in the distributed ledger (see Ethereum Yellow Paper: a formal specification of Ethereum, a programmable blockchain<URL:https://ethereum.github.io/yellowpaper/paper.pdf>).

SUMMARY

Meanwhile, in recent years, with the development of information communication technology, the increase in environmental conservation awareness, and the like, various items are increasingly shared and used by a large number of unspecified users, such as car sharing, shared offices, and the like, rather than being owned by a specific user.

In order to smoothly carry out such sharing, how to manage a use right of an object, that is, a key for using the object, and how to deliver the key to each user are important issues. Currently, examples of a method of delivering the use right include a method of preparing a physical key and actually delivering the key to each user and a method of constructing a web system and delivering an electronic key to each user.

However, the method using a physical key is not favorable from the viewpoint of effort required for management and delivery and risks of damage, loss, and the like. In addition, the method using a web system, which has become the mainstream in recent years, has a problem that the costs and loads for securely constructing and operating an authentication server are extremely high.

The present invention has been conceived in view of the above circumstances, and aims to provide a use right information processing apparatus, a use right information processing system, and a use right information processing method for securely managing a use right of a user without using an authentication server and enabling a valid user to be allowed (authorized) to use a device appropriately.

The object mentioned above is achieved by the following means.

A use right information processing apparatus is provided to perform processing related to authentication and authorization for a user to use a device to be controlled using a smart contract that functions with a computer executing a code recorded on a blockchain, and includes a storage unit, a receiving unit, a deriving unit, and an acquisition unit. The storage unit stored authentication data shared with a user terminal used by the user and having a different value for each process. The receiving unit receives, from the user terminal, signature data generated in the user terminal by signing the authentication data with a predetermined signature algorithm using a secret key corresponding to the user. The deriving unit derives a public key corresponding to the secret key from the authentication data and the signature data received by the receiving unit using an elliptic curve digital signature algorithm. The acquisition unit obtains, using the public key or identification information corresponding to the public key, information regarding a use right of the device of the user recorded in advance in association with the public key or the identification information in the smart contract.

A use right information processing system includes the use right information processing apparatus described above and a user terminal to be used by a user. The user terminal transmits a request for using a device to the use right information processing apparatus on the basis of an instruction from the user, generates signature data by signing authentication data shared with the use right information processing apparatus with an elliptic curve digital signature algorithm using a secret key corresponding to the user, and transmits the generated signature data to the use right information processing apparatus.

A use right information processing method is configured to perform processing related to authentication and authorization for a user to use a device to be controlled using a smart contract that functions with a computer executing a code recorded on a blockchain, and includes a step (a) of storing authentication data shared with a user terminal used by the user and having a different value for each process, a step (b) of receiving, from the user terminal, signature data generated in the user terminal by signing the authentication data with a predetermined signature algorithm using a secret key corresponding to the user, a step (c) of deriving, using an elliptic curve digital signature algorithm, a public key corresponding to the secret key from the authentication data and the signature data received in the step (b), and a step (d) of obtaining, using the public key or identification information corresponding to the public key, information regarding a use right of the device of the user recorded in advance in association with the public key or the identification information in the smart contract.

According to the use right information processing apparatus of the present invention, the public key corresponding to the secret key is derived from the signature data received from the user terminal and the authentication data transmitted to the user terminal. Then, the use right information processing apparatus obtains the information regarding the use right of the device of the user recorded in advance in association with the public key or the identification information in the smart contract using the public key or the identification information corresponding to the public key. With this arrangement, it becomes possible to securely manage the use right using the data on the blockchain having high falsification resistance without using an authentication server that imposes enormous costs and loads on construction and operation, and to allow a valid user to use the device appropriately.

DETAILED DESCRIPTION

Hereinafter, an embodiment of the present invention will be described with reference to the accompanying drawings. Note that the same elements are denoted by the same reference signs in the descriptions of the drawings, and duplicate descriptions will be omitted. In addition, dimensional ratios of the drawings are exaggerated for purposes of illustration, and may be different from actual ratios.

<Configuration of Use Right Information Processing System>

Figure 1:
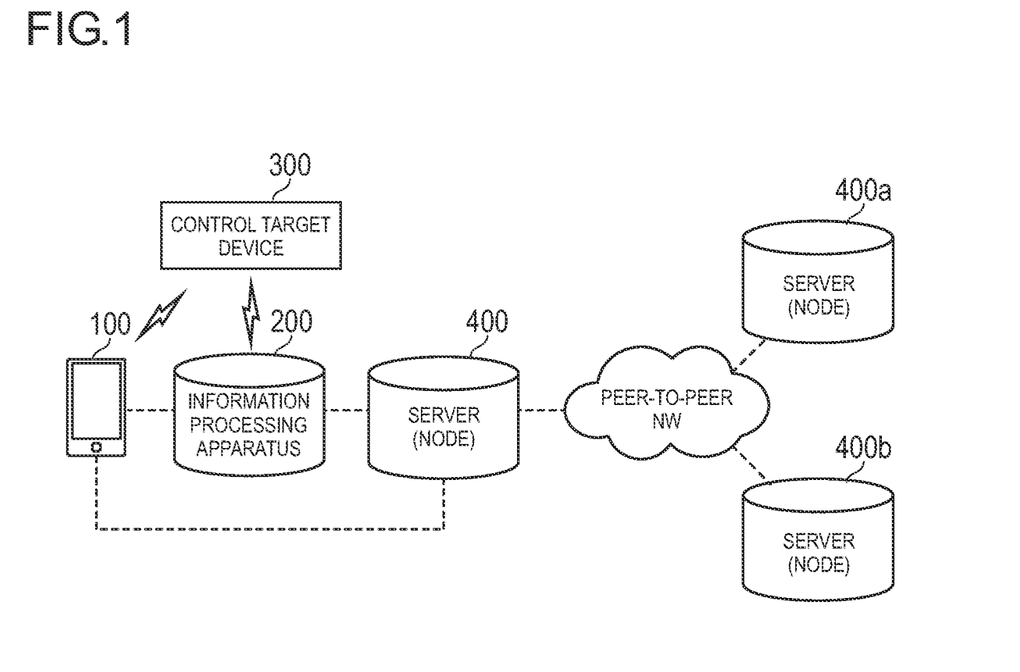
FIG. 1 is a diagram illustrating a schematic configuration of a use right information processing system to which a use right information processing apparatus according to an embodiment of the present invention is applied.

FIG. 1 is a diagram illustrating a schematic configuration of a use right information processing system to which a use right information processing apparatus according to an embodiment of the present invention is applied.

As illustrated in FIG. 1, the use right information processing system includes a user terminal 100, an information processing apparatus 200 that functions as a use right information processing apparatus, a control target device 300, and a server 400 that serves as a node to be connected to a peer-to-peer network. The use right information processing system is a system for securely managing a use right of the control target device 300 without using an authentication server and appropriately allowing a valid user to use the control target device 300. The user terminal 100 is mutually communicably connected to the information processing apparatus 200, the control target device 300, the server 400, and the like via a network such as the Internet, various types of wireless communication, and the like. The information processing apparatus 200 is mutually communicably connected the user terminal 100, the control target device 300, the server 400, and the like via a network such as the Internet, various types of wireless communication, and the like. The control target device 300 is mutually communicably connected to the user terminal 100 and the information processing apparatus 200 via various types of wireless communication or the like. The server 400 is mutually communicably connected to the user terminal 100 and the information processing apparatus 200 via a network such as the Internet, various types of wireless communication, and the like. Furthermore, the server 400 is mutually communicably connected to other servers 400a, 400b, and the like via a peer-to-peer network. Note that connection between the respective configurations is not limited to the examples described above, and the respective configurations may be connected using any method.

Hereinafter, each of the configurations will be described in detail.

<User Terminal 100>

The user terminal 100 is a mobile terminal such as a smartphone or the like, or an information terminal such as a laptop PC, a desktop PC, or the like, which is to be used by the user.

Figure 2:
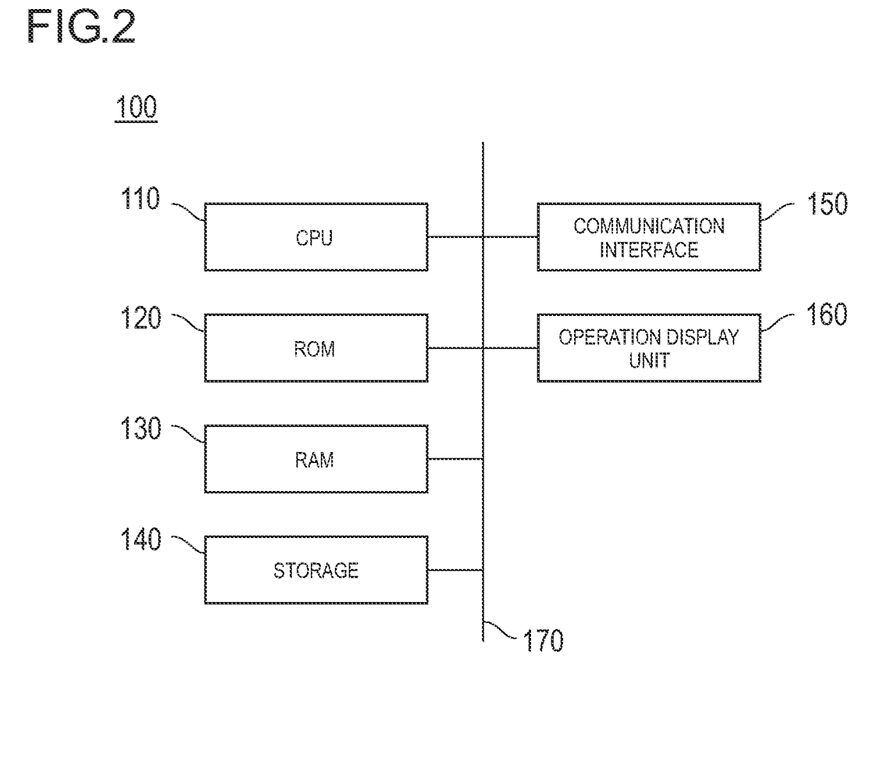
FIG. 2 is a block diagram illustrating a schematic configuration of a user terminal.

FIG. 2 is a block diagram illustrating a schematic configuration of the user terminal.

As illustrated in FIG. 2, the user terminal 100 includes a CPU (Central Processing Unit) 110, a ROM (Read Only Memory) 120, a RAM (Random Access Memory) 130, a storage 140, a communication interface 150, and an operation display unit 160. The respective configurations are communicably connected to each other via a bus 170.

The CPU 110 performs control of the respective configurations described above and various kinds of arithmetic processing in accordance with programs stored in the ROM 120 and the storage 140.

The ROM 120 stores various programs and various data.

The RAM 130 temporarily stores programs and data as a work area.

The storage 140 stores various programs including an operating system, and various data. For example, an application for transmitting/receiving various types of information to/from another device such as the information processing apparatus 200 or the like via a network and displaying various types of information provided from another device is installed in the storage 140.

The communication interface 150 is an interface for communicating with an external device such as the information processing apparatus 200 or the like. For example, a standard such as 3G, 4G, or the like for mobile telephony, a standard such as Wi-Fi (registered trademark), or the like is used as the communication interface 150. A standard for short-range wireless communication such as Bluetooth (registered trademark) or the like may be used as the communication interface 150 to perform communication with a nearby short-range wireless communication device.

The operation display unit 160 is, for example, a touch panel display, which displays various types of information and receives various inputs from the user.

<Information Processing Apparatus 200>

The information processing apparatus 200 is, for example, a computer such as a server or the like, which functions as a use right information processing apparatus in the present embodiment.

Figure 3:
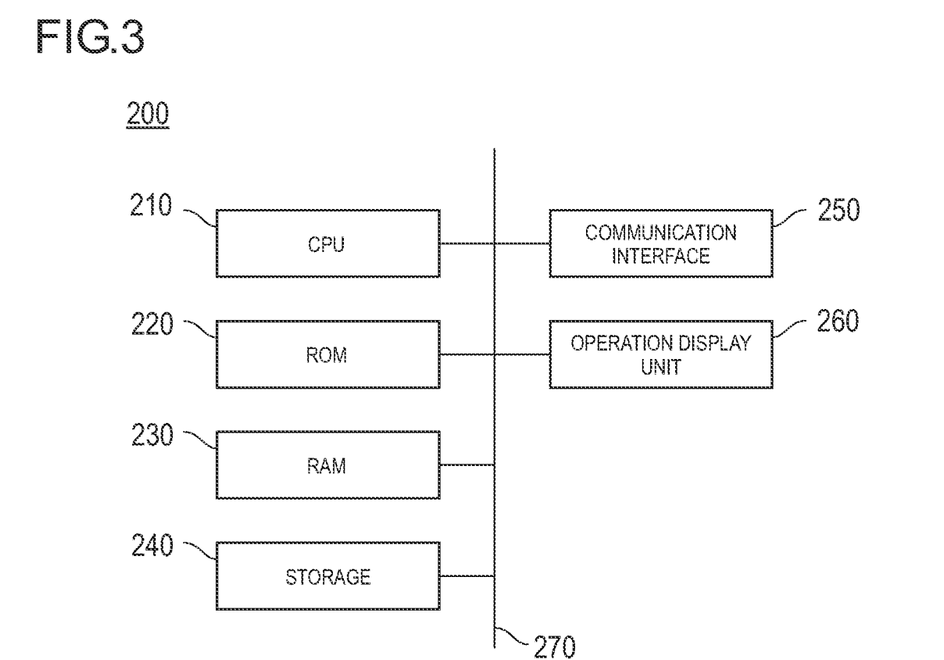
FIG. 3 is a block diagram illustrating a schematic configuration of an information processing apparatus.

FIG. 3 is a block diagram illustrating a schematic configuration of the information processing apparatus.

As illustrated in FIG. 3, the information processing apparatus 200 includes a CPU 210, a ROM 220, a RAM 230, a storage 240, a communication interface 250, and an operation display unit 260. The respective configurations are communicably connected to each other via a bus 270. Note that the CPU 210, the ROM 220, the RAM 230, the storage 240, the communication interface 250, and the operation display unit 260 have functions similar to those of the corresponding configurations of the user terminal 100, and thus duplicate descriptions thereof will be omitted.

Programs and data for performing various kinds of processing are installed in the storage 240. In addition, the storage 240 stores various kinds of identification information and the like for performing communication with the user terminal 100, the control target device 300, and the server 400. Furthermore, the storage 240 stores a program for generating authentication data, a program for verifying signature data, a program for generating an access token, and the like.

The CPU 210 functions as a receiving unit, a deriving unit, an acquisition unit, an authentication data generation unit, a determination unit, a token generation unit, and a validity confirmation unit in the present embodiment. Each of the functions to be implemented by the CPU 210 will be detailed later. Furthermore, the storage 240 functions as a storage unit in the present embodiment.

<Control Target Device 300>

Figure 4:
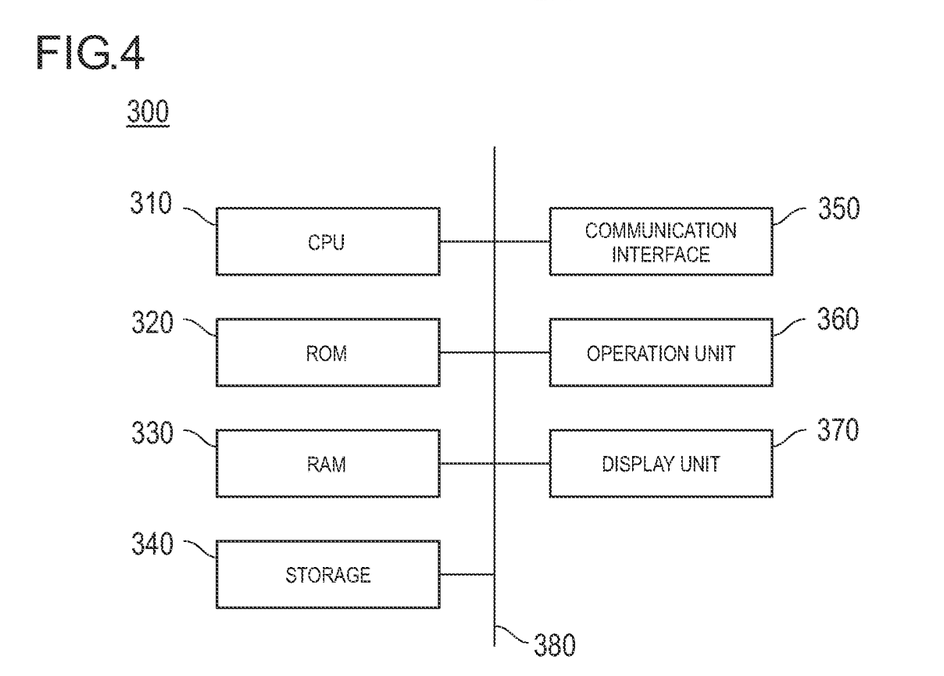
FIG. 4 is a block diagram illustrating a schematic configuration of a control target device.

The control target device 300 is a device to be controlled by the user by obtaining a use right, and is, for example, an electronically controllable car key in car sharing, an electronically controllable key of a building in an office sharing service, or the like. The control target device 300 is not limited to the key as mentioned above, and may be any device as long as it is an electronically controllable device to be used by the user.

FIG. 4 is a block diagram illustrating a schematic configuration of the control target device.

As illustrated in FIG. 4, the control target device 300 includes a CPU 310, a ROM 320, a RAM 330, a storage 340, a communication interface 350, and an operation display unit 360. The respective configurations are communicably connected to each other via a bus 370. Note that the CPU 310, the ROM 320, the RAM 330, the storage 340, the communication interface 350, and the operation display unit 360 have functions similar to those of the corresponding configurations of the user terminal 100, and thus duplicate descriptions thereof will be omitted.

The storage 340 stores various programs and data for executing a control instruction and operating the control target device 300.

<Server 400>

Figure 5:
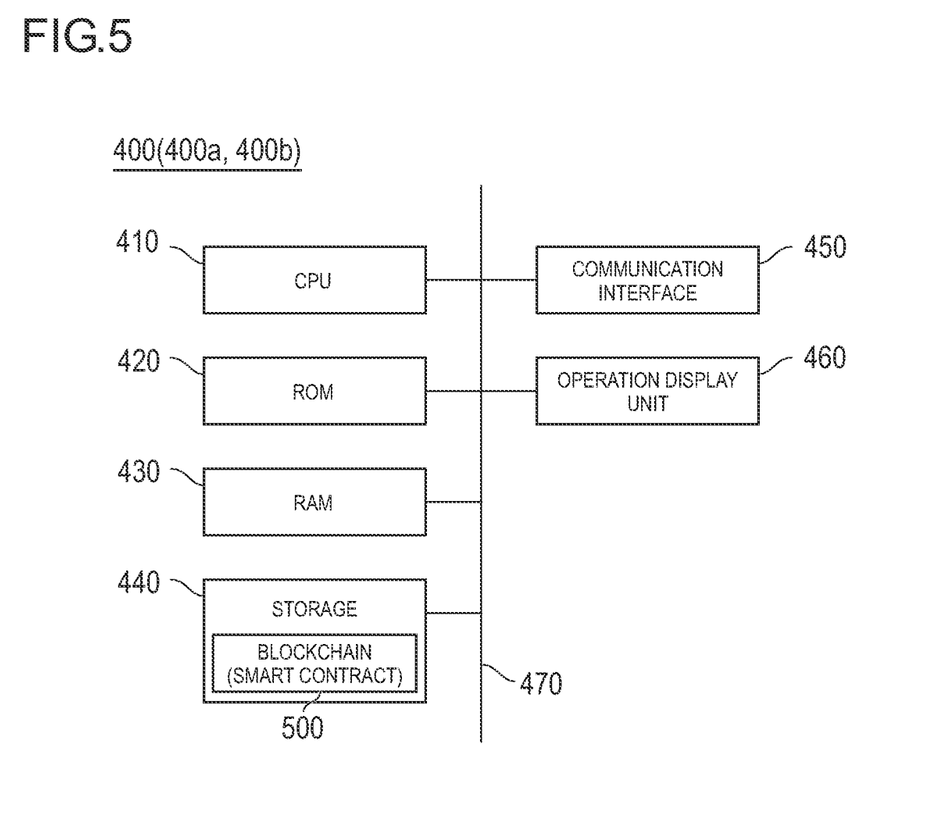
FIG. 5 is a block diagram illustrating a schematic configuration of a server that serves as a node connected to a peer-to-peer network.

The server 400 is a node connected to a peer-to-peer network, and mutually communicates with the servers 400a, 400b, and the like, which are other nodes, via the peer-to-peer network. Each node such as the server 400 or the like stores a common blockchain, and executes a code recorded on the blockchain to execute a smart contract. The server 400 may be a full node that retains all pieces of information in the blockchain, or may be a light node that retains information such as a hash value for proving each data and the like.

FIG. 5 is a block diagram illustrating a schematic configuration of the server.

As illustrated in FIG. 5, the server 400 includes a CPU 410, a ROM 420, a RAM 430, a storage 440, a communication interface 450, and an operation display unit 460. The respective configurations are communicably connected to each other via a bus 470. Note that the CPU 410, the ROM 420, the RAM 430, the communication interface 450, and the operation display unit 460 have functions similar to those of the corresponding configurations of the user terminal 100, and thus duplicate descriptions thereof will be omitted.

The storage 440 stores a blockchain 500 in which a code, a setting value, and the like for executing a smart contract are recorded. The blockchain 500 may be configured by a publicly known blockchain platform such as Ethereum capable of executing a smart contract or the like, and detailed descriptions thereof will be omitted. Furthermore, a method of electronic signature using a secret key and a public key is also a publicly known technique, and detailed descriptions thereof will be omitted.

For example, in a case where Ethereum is used as a blockchain platform for implementing a smart contract, the user has his/her own Ethereum account, and the account is associated with a secret key of the user, a public key of the user, and an address of the user. The secret key and the public key of the user are defined in association with each other in an encryption scheme used in an electronic signature algorithm adopted by the blockchain platform. The address of the user is information for identifying the user, and for example, information that can be uniquely derived from the public key of the user is used. The blockchain platform for implementing the smart contract is not limited to Ethereum, and various platforms such as EOS, NEO, Zilliqa, an independently constructed platform, and the like are used.

<Function of Information Processing Apparatus 200>

Figure 6:
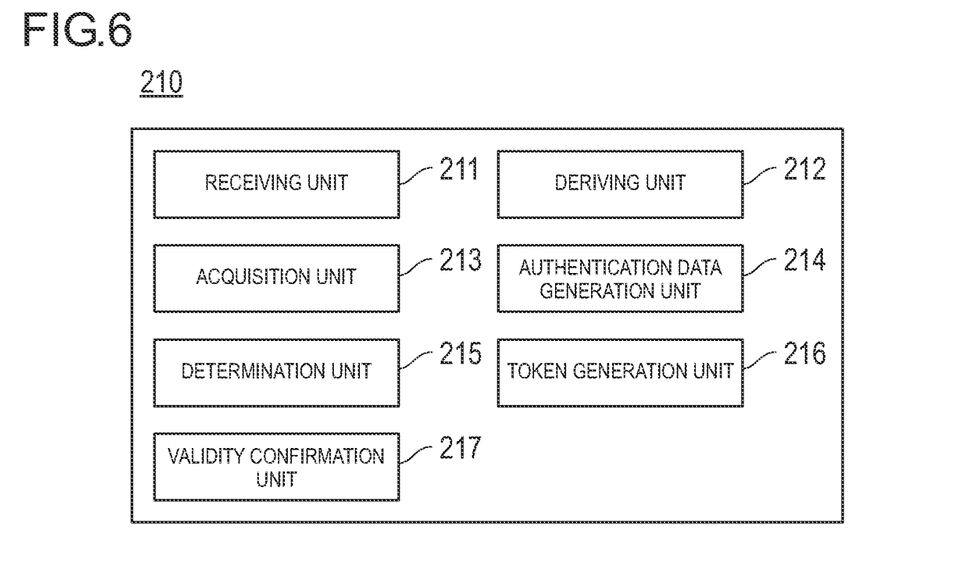
FIG. 6 is a block diagram illustrating a functional configuration of a CPU of the information processing apparatus.

FIG. 6 is a block diagram illustrating a functional configuration of the CPU of the information processing apparatus.

As illustrated in FIG. 6, the CPU 210 reads the programs stored in the storage 240 and executes processing, whereby the information processing apparatus 200 functions as a receiving unit 211, a deriving unit 212, an acquisition unit 213, an authentication data generation unit 214, a determination unit 215, a token generation unit 216, and a validity confirmation unit 217.

The receiving unit 211 receives, from the user terminal 100, signature data generated in the user terminal 100 by signing the authentication data with a predetermined signature algorithm using the secret key corresponding to the user. The receiving unit 211 may further receive a control instruction to the control target device 300 from the user terminal 100.

The deriving unit 212 derives the public key corresponding to the secret key from the authentication data and the signature data received by the receiving unit 211 using a predetermined signature algorithm.

The acquisition unit 213 obtains information regarding the use right of the control target device 300 of the user recorded in advance in association with the public key or the identification information in the smart contract using the public key derived by the deriving unit 212 or the identification information corresponding to the public key.

The authentication data generation unit 214 generates authentication data on the basis of a request from the user terminal 100 used by the user, and transmits the generated authentication data to the user terminal 100, thereby causing the authentication data to be shared between the information processing apparatus 200 and the user terminal 100.

The determination unit 215 determines availability of the control target device 300 for the user on the basis of the information regarding the use right obtained by the acquisition unit 213.

The token generation unit 216 generates an access token to transmit it to the user terminal 100 in a case where it is determined that the control target device 300 can be used by the user on the basis of the information regarding the use right obtained by the acquisition unit 213.

The validity confirmation unit 217 receives the access token from the control target device 300 that has received the access token together with the control instruction from the user terminal 100, determines whether or not the access token received from the control target device 300 is the same as the access token generated by the token generation unit 216, and in a case of being the same, transmits information indicating that the access token is valid to the control target device 300.

<Outline of Process in Use Right Information Processing System>

Hereinafter, an exemplary process to be executed in the use right information processing system will be described.

First, a process of registering (purchasing) a use right will be described.

Figure 7:
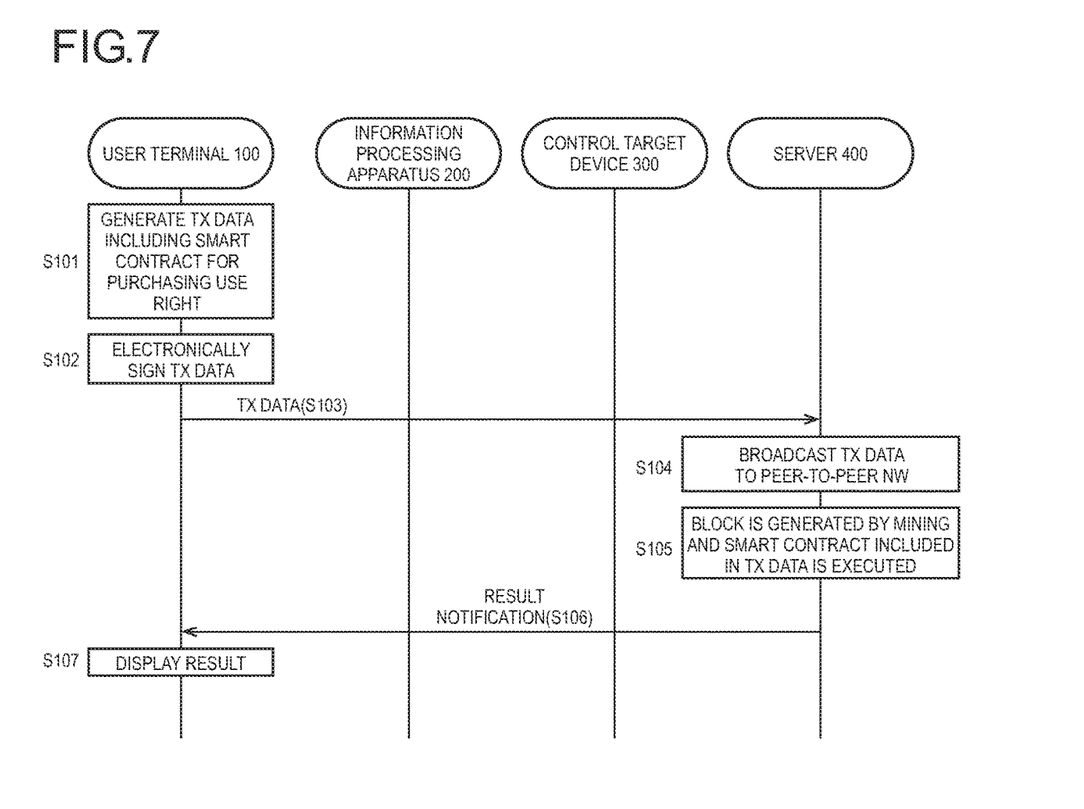
FIG. 7 is a sequence chart illustrating a procedure of a use right registration (purchase) process executed in the use right information processing system.
Figure 8:
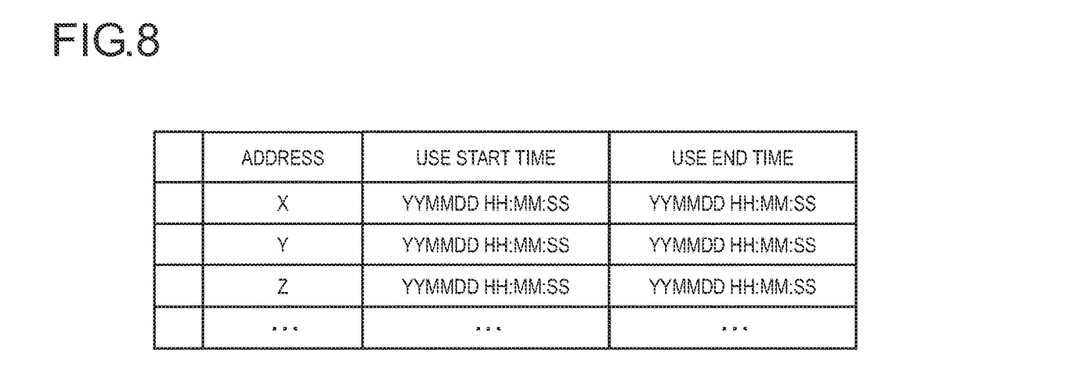
FIG. 8 is a diagram illustrating an example of use right information for each address recorded on a blockchain.

FIG. 7 is a sequence chart illustrating a procedure of the use right registration (purchase) process to be executed in the use right information processing system. FIG. 8 is a diagram illustrating an example of use right information for each address recorded on the blockchain. Processing of each device illustrated in the sequence chart of FIG. 7 is stored in the storage of each device as a program, and is executed by the CPU of each device controlling each unit.

As illustrated in FIG. 7, the user terminal 100 receives an instruction to use the control target device 300 from the user, and generates transaction data (TX data) including a smart contract for purchasing a use right of the control target device 300 (step S101). For example, in a case of using the control target device 300 via a business operator providing a service of enabling a purchase of the use right for a predetermined period of time by transmitting a predetermined amount of cryptocurrency to a predetermined destination address, the TX data includes the user address, the destination address (address of the smart contract), the amount of cryptocurrency, information indicating intention to purchase the use right, information indicating use start time, and the like. For example, a method (function) indicating the purchase defined in the smart contract may be used as the information indicating the intention to purchase the use right, and the information indicating the user address or the use start time may be set as an argument of the method.

Subsequently, the user terminal 100 generates an electronic signature for the generated TX data using the secret key of the user stored in advance in the storage 140 (step S102).

Subsequently, the user terminal 100 transmits the TX data together with the generated electronic signature to the server 400 (step S103).

The server 400 broadcasts the received TX data to the peer-to-peer network (step S104). When mining of the blockchain 500 is executed by a node such as the server or the like connected to the peer-to-peer network to generate a block, the smart contract included in the TX data is executed (step S105).

As a result, use right information for each user address as illustrated in FIG. 8 is recorded on the blockchain 500. In the example of FIG. 8, an address of a user, use start time of the user, and use end time are recorded in association with each other. In that case, when the user address and the current time are known, it is possible to easily determine whether or not the user has the use right at that point in time. A form of the use right information to be recorded on the blockchain 500 is not limited to the example of FIG. 8, and may be implemented in any form. For example, information indicating a status such as availability or the like may be recorded in association with each other as the use right information. Furthermore, as the use right information, information regarding any use condition may be recorded such as information regarding the number of available hours, information regarding the number of uses, available days of the week and periods of time, available locations, areas, and ranges, available types of the control target device 300, combinations thereof, and the like, for example. Furthermore, not only the available condition but also information regarding an unavailable condition (exclusion condition) may be recorded as the use right information. In other words, information for expressing various conditions for defining the use right may be appropriately set as the use right information.

The server 400 notifies the user terminal 100 of a result of the execution of the smart contract based on the TX data (step S106), and the user terminal 100 displays the notified result on the operation display unit 160 (step S107).

Note that, while the descriptions have been given assuming that the user terminal 100 generates the TX data to transmit it to the server 400 in the example above, those processes may be executed by a server or the like operated by a service provider, which is what is called an exchange.

Next, a process of authenticating the user, confirming the use right, and authorizing use by the user will be described.

Figure 9:
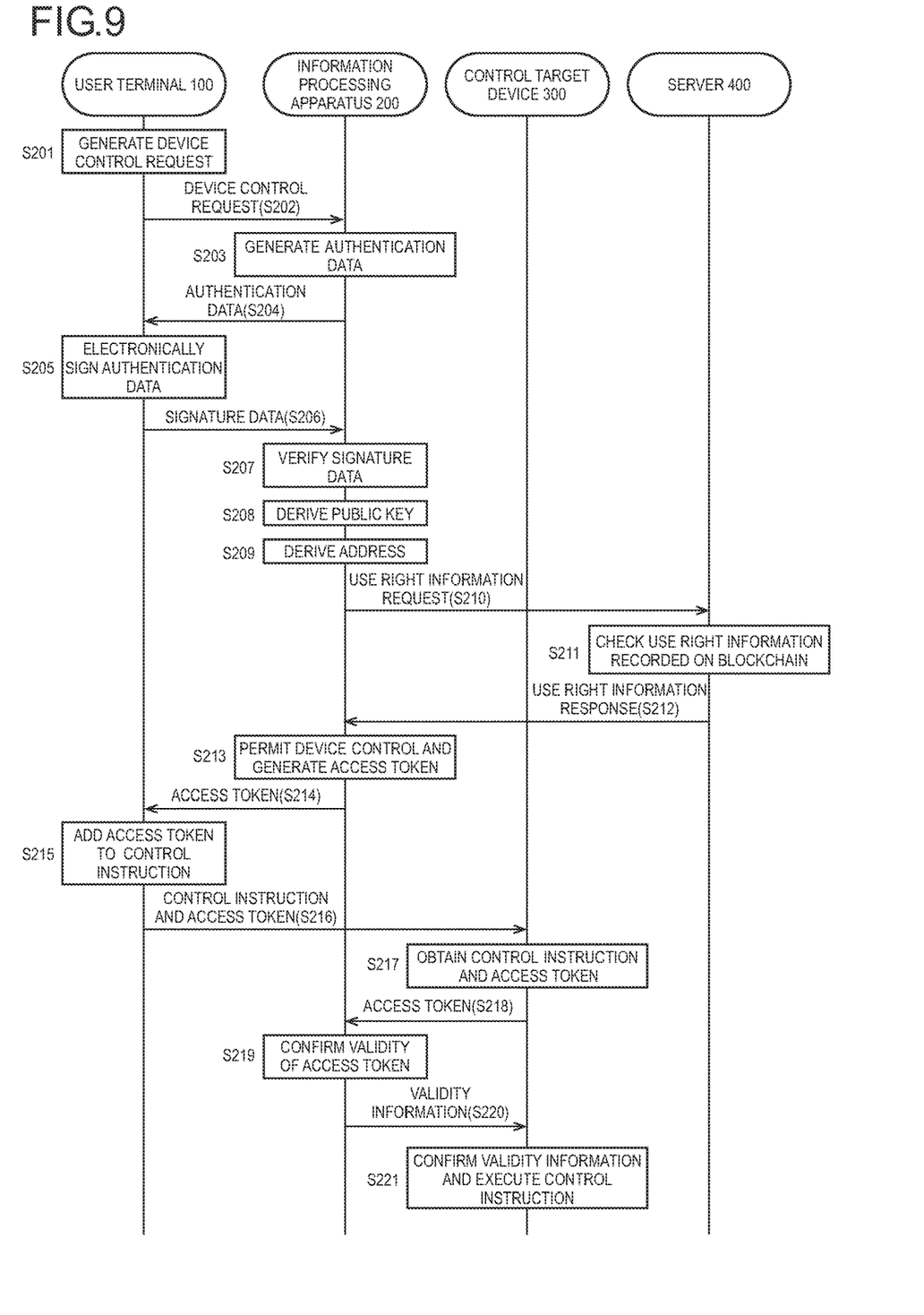
FIG. 9 is a sequence chart illustrating an exemplary procedure of an authentication and authorization process executed in the use right information processing system.

FIG. 9 is a sequence chart illustrating a procedure of the authentication and authorization process to be executed in the use right information processing system. Processing of each device illustrated in the sequence chart of FIG. 9 is stored in the storage of each device as a program, and is executed by the CPU of each device controlling each unit.

As illustrated in FIG. 9, the user terminal 100 generates a device control request related to control of the control target device 300 on the basis of an instruction from the user or the like (step S201), and transmits it to the information processing apparatus 200 (step S202).

When the information processing apparatus 200 receives the device control request from the user terminal 100, it generates authentication data (step S203), and transmits it to the user terminal 100 (step S204). The authentication data is information for confirming validity of the user terminal 100 and the user, which is information to be shared between the user terminal 100 and the information processing apparatus 200 and having a different value for each process. In the present embodiment, the authentication data is randomly generated by the information processing apparatus 200 to have a different value for each time. The information processing apparatus 200 stores, in the storage 240, the authentication data transmitted to the user terminal 100 in association with information regarding the user terminal 100.

The user terminal 100 gives an electronic signature to the authentication data received from the information processing apparatus 200 using the secret key corresponding to the user with a predetermined signature algorithm to generate signature data (step S205), and transmits it to the information processing apparatus 200 (step S206). In the present embodiment, an elliptic curve digital signature algorithm capable of deriving a public key corresponding to a secret key from authentication data and signature data obtained by signing the authentication data with the secret key is used as the predetermined signature algorithm.

The information processing apparatus 200 verifies the signature data received from the user terminal 100 using the signature algorithm described above (step S207), and derives the public key corresponding to the secret key of the user who has signed the signature data (step S208). Specifically, the information processing apparatus 200 verifies the signature data using the elliptic curve digital signature algorithm using the signature data received from the user terminal 100 and the authentication data transmitted to the user terminal 100 stored in the storage 240, thereby deriving the public key of the user.

The information processing apparatus 200 derives the address, which is the identification information of the user, from the derived public key (step S209). Note that the processing of step S209 may be omitted if the value of the public key is directly used as the address.

The information processing apparatus 200 transmits the derived address of the user to the server 400, and requests information regarding the use right of the user associated with the control target device 300 (step S210).

The server 400 checks, using the received address of the user, the information regarding the use right of the user associated with the control target device 300 stored in advance in association with the address of the user in the smart contract on the blockchain (step S211).

The server 400 transmits the information regarding the use right checked in the processing of step S211 to the information processing apparatus 200 (step S212).

The information processing apparatus 200 checks the contents of the information regarding the use right transmitted from the server 400, and if the user is in a state of holding the use right of the control target device 300, allows the user to control the control target device 300 to generate an access token (step S213), and transmits it to the user terminal 100 (step S214). The access token is information uniquely generated for each process, which is a random value having a sufficient size or length of, for example, 16 bytes, 32 bytes, or the like. The access token is used as an authentication code when the user controls the control target device 300. The access token includes information regarding a use period of the access token. The information processing apparatus 200 stores, in the storage 240, the access token transmitted to the user terminal 100 in association with information regarding the user terminal 100 or the user who uses the user terminal 100 or the like. Note that, if the user is in a state of not holding the use right of the control target device 300, the information processing apparatus 200 notifies the user terminal 100 of the fact without allowing the user to control the control target device 300.

The user terminal 100 adds the access token transmitted from the information processing apparatus 200 to a control instruction for controlling the control target device 300 (step S215), and transmits the control instruction to the control target device 300 (step S216).

The control target device 300 obtains the control instruction and the access token transmitted from the user terminal 100 (step S217), and transmits the access token to the information processing apparatus 200 together with the information regarding the user terminal 100 or the user (step S218).

The information processing apparatus 200 confirms validity of the access token transmitted from the control target device 300 (step S219). Specifically, the information processing apparatus 200 searches the storage 240 using the information regarding the user terminal 100 or the user transmitted from the control target device 300, and extracts the access token stored in association with the information regarding the user terminal 100 or the user. Then, the information processing apparatus 200 compares the access token extracted from the storage 240 with the access token transmitted from the control target device 300, and determines that the access token is valid if the two are the same. In that case, the information processing apparatus 200 transmits information indicating that the access token is valid (validity information) to the control target device 300 (step S220). On the other hand, if the two are not the same, it is determined that the access token is not valid. In addition, also in a case where the use period included in the access token has elapsed, it is determined that the access token is not valid. When the access token is determined not to be valid, the information processing apparatus 200 notifies the control target device 300 of the fact, and the control target device 300 notifies the user terminal 100 of the fact.

The control target device 300 confirms the validity information transmitted from the information processing apparatus 200, and executes the control instruction received from the user terminal 100 (step S221).

Note that the present invention is not limited to the embodiment described above, and various modifications may be made within the scope of the claims.

For example, while the example in which the user terminal 100 transmits the control instruction to the control target device 300 in the processing of step S216 in FIG. 9 has been described in the embodiment above, it is not limited thereto. For example, the user terminal 100 may transmit the control instruction to the information processing apparatus 200, and the information processing apparatus 200 may transmit the control instruction to the control target device 300. In that case, the CPU 210 of the information processing apparatus 200 functions as a device control unit. Hereinafter, this example will be specifically described.

Figure 10:
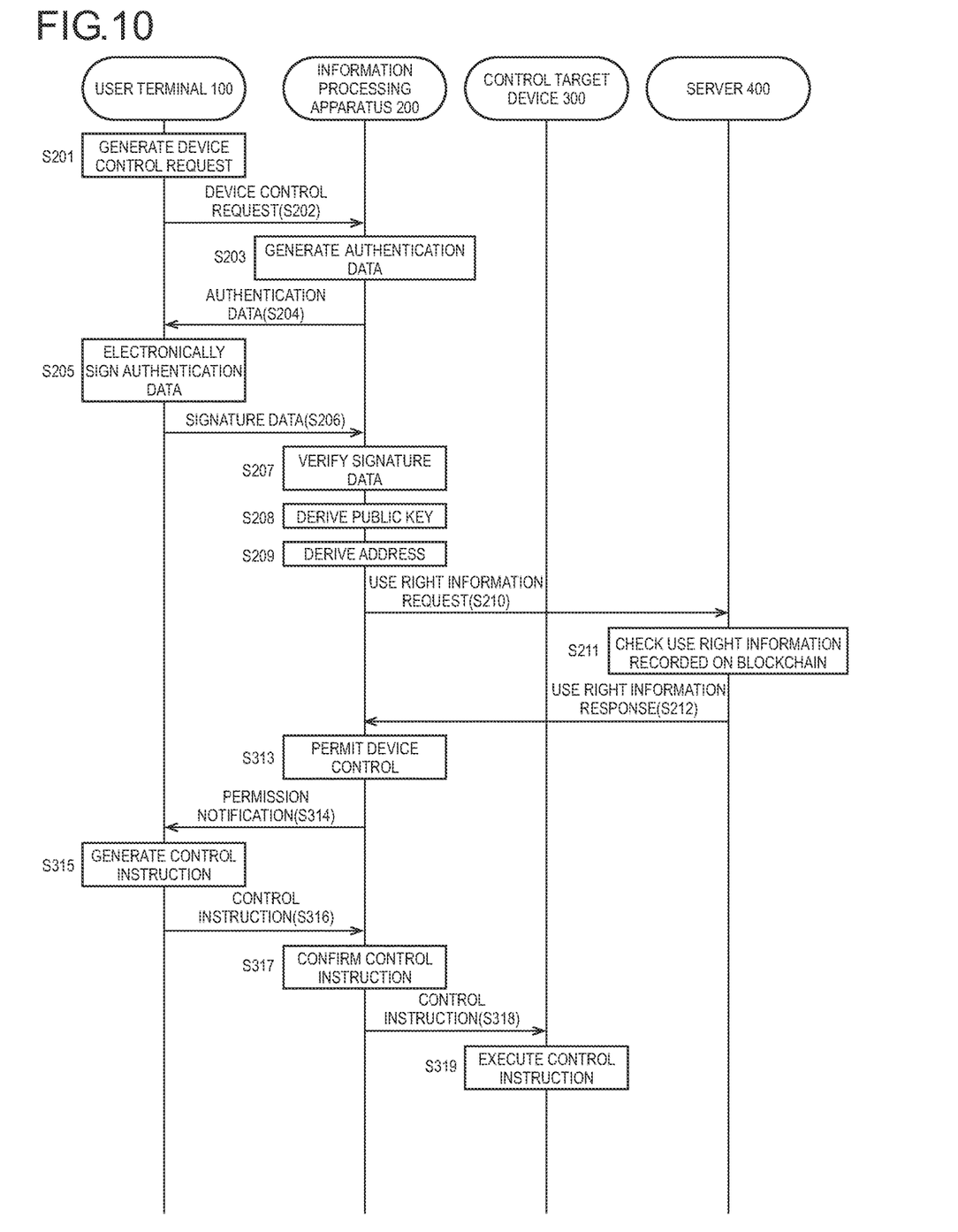
FIG. 10 is a sequence chart illustrating another exemplary procedure of the authentication and authorization process executed in the use right information processing system.

FIG. 10 is a sequence chart illustrating another exemplary procedure of the authentication and authorization process to be executed in the use right information processing system. The process in steps S201 to S212 in FIG. 10 is similar to that in FIG. 9, and descriptions thereof will be omitted.

As illustrated in FIG. 10, the information processing apparatus 200 checks the contents of the information regarding the use right transmitted from the server 400, and if the user is in a state of holding the use right of the control target device 300, allows the user to control the control target device 300 (step S313), and notifies the user terminal 100 of the fact (step S314).

The user terminal 100 generates a control instruction for controlling the control target device 300 (step S315), and transmits it to the information processing apparatus 200 (step S316).

The information processing apparatus 200 confirms the control instruction transmitted from the user terminal 100 (step S317), and transmits it to the control target device 300 (step S318).

The control target device 300 confirms and executes the control instruction transmitted from the information processing apparatus 200 (step S319).

Note that, although it has been described above that the control instruction is newly generated in the processing of step S315, the control instruction may be included in the device control request generated in the processing of step S201. In that case, when the information processing apparatus 200 allows the device control in the processing of step S313, it may transmit the control instruction included in the device control request that has already been received to the control target device 300. With this arrangement, the process of steps S314 to S317 may be omitted.

Furthermore, while the example in which the user terminal 100 signs only the authentication data that is a random value with the secret key of the user has been described in the embodiment above, it is not limited thereto. The user terminal 100 can add optional information such as a control instruction or the like to the authentication data and sign the authentication data with the secret key of the user. Even in this case, the information processing apparatus 200 can derive the public key of the user from the authentication data, the added optional information, and the signed signature data to derive the address.

Moreover, while the descriptions have been given assuming that the authentication data is randomly generated by the information processing apparatus 200 to have a different value for each time in the embodiment above, it is not limited thereto. It is sufficient if the authentication data is information to be shared between the user terminal 100 and the information processing apparatus 200 and having a different value for each process. Therefore, in a case of performing encryption based on the AES scheme or the like between the user terminal 100 and the information processing apparatus 200, a random value (initialization vector) shared between the user terminal 100 and the information processing apparatus 200 is used in the AES-based encryption process, and that may be used instead of the authentication data, accordingly. For example, the user terminal 100 generates information obtained by performing the AES-based encryption on the control instruction as authentication data, and signs it with the secret key of the user to transmit signature data to the information processing apparatus 200. In that case, the information processing apparatus 200 can derive the public key of the user from the information obtained by performing the AES-based encryption on the control instruction and the signature data.

Furthermore, each configuration of the user terminal 100, the information processing apparatus 200, the control target device 300, and the server 400 included in the use right information processing system may include components other than the components mentioned above, or may not include some of the components mentioned above.

Furthermore, each of the user terminal 100, the information processing apparatus 200, the control target device 300, and the server 400 may be configured by a plurality of devices, or may be configured by a single device. In addition, the function of each configuration may be implemented by another configuration. For example, the information processing apparatus 200 and the server 400 may be constructed by one device. Furthermore, the information processing apparatus 200 may be incorporated in the control target device 300, and each process described as being executed by the information processing apparatus 200 may be executed by the control target device 300. Furthermore, the function of the information processing apparatus 200 may be implemented as an application of the user terminal 100, and may be executed by the user terminal 100.

Furthermore, the process in the use right information processing system according to the embodiment described above may include steps other than the steps in the flowchart or sequence chart described above, or may not include some of the steps described above. In addition, the order of the steps is not limited to that in the embodiment described above. Moreover, each step may be combined with another step and executed as one step, may be included in another step and executed, or may be divided into a plurality of steps and executed. In addition, some of the steps may be omitted, or other steps may be added.

As described above, according to the information processing apparatus 200 of the present embodiment, the public key corresponding to the secret key is derived from the signature data received from the user terminal 100 and the authentication data transmitted to the user terminal 100. Then, the information processing apparatus 200 obtains the information regarding the use right of the control target device 300 of the user recorded in advance in association with the public key or the identification information in the smart contract using the public key or the identification information corresponding to the public key. With this arrangement, it becomes possible to securely manage the use right of the user using the data on the blockchain having high falsification resistance without using an authentication server that imposes enormous costs and loads on construction and operation, and to allow (authorize) a valid user to use the control target device 300 appropriately.

In addition, the information processing apparatus 200 generates authentication data on the basis of a request from the user terminal 100, and transmits the generated authentication data to the user terminal 100, thereby causing the authentication data to be shared with the user terminal 100. With this arrangement, different authentication data is generated to be used for the electronic signature each time a request is issued from the user terminal 100, whereby it becomes possible to suppress fraudulent use of the signature data and the like by an invalid user terminal 100, and to manage the use right more securely.

In addition, the information processing apparatus 200 determines availability of the control target device 300 for the user on the basis of the obtained information regarding the use right. With this arrangement, it becomes possible to quickly and reliably allow a valid user to use the control target device 300.

Furthermore, the elliptic curve digital signature algorithm capable of deriving a public key from the signature data and the authentication data is used as a predetermined signature algorithm. With this arrangement, the information processing apparatus 200 is enabled to derive the public key from the signature data that is a result of being signed with the secret key and the authentication data that is data to be signed. As a result, it becomes possible to negate the need to share the public key for signature verification in advance between the user terminal 100 and the information processing apparatus 200. In order to share the public key in advance, a process of checking whether or not the received public key is valid and saving it occurs. According to the present embodiment, the public key can be derived from the signature data and the authentication data so that there is no need to share the public key in advance or to check the validity of the public key, whereby it becomes possible to construct and operate the system efficiently.

Furthermore, the identification information is address information that can be uniquely derived from the public key. Therefore, there is no need to separately prepare and manage information for identifying the user, and the system can be constructed and operated more efficiently.

Furthermore, in the smart contract, information regarding the available time is recorded as information regarding the use right of the device in association with the public key or the identification information. With this arrangement, it becomes possible to provide a service in which the use right is entitled to the user with a specific available time, and to enhance the convenience of the service provider and the user.

In addition, in the smart contract, information regarding the number of available times is recorded as the information regarding the use right of the device in association with the public key or the identification information. With this arrangement, it becomes possible to provide a service in which the use right is entitled to the user with a specific number of available times, and to enhance the convenience of the service provider and the user.

Furthermore, the information processing apparatus 200 generates an access token to transmit it to the user terminal 100 in a case where it is determined that the control target device 300 can be used by the user on the basis of the obtained information regarding the use right. Then, the access token is received from the control target device 300 that has received the access token together with the control instruction from the user terminal 100, whether or not the access token received from the control target device 300 is the same as the generated access token is determined, and in a case of being the same, the information indicating that the access token is valid is transmitted to the control target device 300. With this arrangement, even in a case where the information processing apparatus 200 that has confirmed the use right of the user does not directly control the control target device 300 and another device controls the control target device 300, it is possible to reliably allow a valid user to use the control target device 300.

In addition, the access token is data uniquely generated for each process, and includes information regarding a use period. With this arrangement, even in a case where the information processing apparatus 200 that has confirmed the use right of the user does not directly control the control target device 300 and another device controls the control target device 300, it is possible to allow a valid user to use the control target device 300 more reliably.

In addition, the information processing apparatus 200 may further receive the control instruction for the control target device 300 from the user terminal 100, and may transmit the control instruction to the control target device 300 in a case where it is determined that the user is allowed to use the control target device 300 on the basis of the obtained information regarding the use right. With this arrangement, the information processing apparatus 200 that has confirmed the use right of the user is enabled to directly control the control target device 300, whereby it is possible to quickly, reliably, and efficiently allow a valid user to use the control target device 300.

The means and method for performing various processes in the use right information processing system according to the embodiment described above may be achieved by either a dedicated hardware circuit or a programmed computer. The program may be provided by, for example, a computer-readable recording medium such as a flexible disk, a CD-ROM, and the like, or may be provided online via a network such as the Internet and the like. In that case, the program recorded in the computer-readable recording medium is normally transferred to a storage unit, such as a hard disk or the like, and is stored therein. Furthermore, the program may be provided as single application software, or may be incorporated into the software of the device as one function of the use right information processing system.

REFERENCE SIGNS LIST 100 user terminal
200 information processing apparatus
300 control target device
400 server
500 blockchain
110, 210, 310, 410 CPU
120, 220, 320, 420 ROM
130, 230, 330, 430 RAM
140, 240, 340, 440 storage
150, 250, 350, 450 communication interface
160, 260, 360, 460 operation display unit
FIG. 1
200 INFORMATION PROCESSING APPARATUS
300 CONTROL TARGET DEVICE
400 SERVER (NODE)
400a SERVER (NODE)
400b SERVER (NODE)
PEER-TO-PEER NW
FIG. 2
140 STORAGE
150 COMMUNICATION INTERFACE
160 OPERATION DISPLAY UNIT
FIG. 3
240 STORAGE
250 COMMUNICATION INTERFACE
260 OPERATION DISPLAY UNIT
FIG. 4
340 STORAGE
350 COMMUNICATION INTERFACE
360 OPERATION UNIT
370 DISPLAY UNIT
FIG. 5
440 STORAGE
450 COMMUNICATION INTERFACE
460 OPERATION DISPLAY UNIT
500 BLOCKCHAIN (SMART CONTRACT)
FIG. 6
211 RECEIVING UNIT
212 DERIVING UNIT
213 ACQUISITION UNIT
214 AUTHENTICATION DATA GENERATION UNIT
215 DETERMINATION UNIT
216 TOKEN GENERATION UNIT
217 VALIDITY CONFIRMATION UNIT
FIG. 7
USER TERMINAL 100
INFORMATION PROCESSING APPARATUS 200
CONTROL TARGET DEVICE 300
SERVER 400
S101 GENERATE TX DATA INCLUDING SMART CONTRACT FOR PURCHASING USE RIGHT
S102 ELECTRONICALLY SIGN TX DATA
S103 TX DATA
S104 BROADCAST TX DATA TO PEER-TO-PEER NW
S105 BLOCK IS GENERATED BY MINING AND SMART CONTRACT INCLUDED IN TX DATA IS EXECUTED
S106 RESULT NOTIFICATION
S107 DISPLAY RESULT
FIG. 8
ADDRESS
USE START TIME
USE END TIME
FIG. 9
USER TERMINAL 100
INFORMATION PROCESSING APPARATUS 200
CONTROL TARGET DEVICE 300
SERVER 400
S201 GENERATE DEVICE CONTROL REQUEST
S202 DEVICE CONTROL REQUEST
S203 GENERATE AUTHENTICATION DATA
S204 AUTHENTICATION DATA
S205 ELECTRONICALLY SIGN AUTHENTICATION DATA
S206 SIGNATURE DATA
S207 VERIFY SIGNATURE DATA
S208 DERIVE PUBLIC KEY S209 DERIVE ADDRESS
S210 USE RIGHT INFORMATION REQUEST
S211 CHECK USE RIGHT INFORMATION RECORDED ON BLOCKCHAIN
S212 USE RIGHT INFORMATION RESPONSE
S213 PERMIT DEVICE CONTROL AND GENERATE ACCESS TOKEN
S214 ACCESS TOKEN
S215 ADD ACCESS TOKEN TO CONTROL INSTRUCTION
S216 CONTROL INSTRUCTION AND ACCESS TOKEN
S217 OBTAIN CONTROL INSTRUCTION AND ACCESS TOKEN
S218 ACCESS TOKEN
S219 CONFIRM VALIDITY OF ACCESS TOKEN
S220 VALIDITY INFORMATION
S221 CONFIRM VALIDITY INFORMATION AND EXECUTE CONTROL INSTRUCTION
FIG. 10
USER TERMINAL 100
INFORMATION PROCESSING APPARATUS 200
CONTROL TARGET DEVICE 300
SERVER 400
S201 GENERATE DEVICE CONTROL REQUEST
S202 DEVICE CONTROL REQUEST
S203 GENERATE AUTHENTICATION DATA
S204 AUTHENTICATION DATA
S205 ELECTRONICALLY SIGN AUTHENTICATION DATA
S206 SIGNATURE DATA
S207 VERIFY SIGNATURE DATA
S208 DERIVE PUBLIC KEY
S209 DERIVE ADDRESS
S210 USE RIGHT INFORMATION REQUEST
S211 CHECK USE RIGHT INFORMATION RECORDED ON BLOCKCHAIN
S212 USE RIGHT INFORMATION RESPONSE
S313 PERMIT DEVICE CONTROL
S314 PERMISSION NOTIFICATION
S315 GENERATE CONTROL INSTRUCTION
S316 CONTROL INSTRUCTION
S317 CONFIRM CONTROL INSTRUCTION
S318 CONTROL INSTRUCTION
S319 EXECUTE CONTROL INSTRUCTION

The invention claimed is:

1. A use right information processing apparatus for performing processes related to authentication and authorization for a user to use a device to be controlled using a smart contract that functions with a computer executing a code recorded on a blockchain, the use right information processing apparatus comprising:
   a storage unit that stores authentication data shared with a user terminal used by the user and having a different value for each of the processes;
   a receiving unit that receives, from the user terminal, signature data generated in the user terminal by signing the authentication data with a predetermined signature algorithm using a secret key corresponding to the user;
   a deriving unit that derives, using the predetermined signature algorithm, a public key corresponding to the secret key from the authentication data and the signature data received by the receiving unit;
   an acquisition unit that obtains, using the public key or identification information corresponding to the public key, information regarding a use right of the device of the user recorded in advance in association with the public key or the identification information in the smart contract;
   a token generation unit that generates an access token and transmits the access token to the user terminal in a case where the user is determined to be allowed to use the device on a basis of the information regarding the use right obtained by the acquisition unit; and
   a validity confirmation unit that receives an access token from the device that has received the access token together with a control instruction from the user terminal, determines whether or not the access token received from the device is same as the access token generated by the token generation unit, and in a case of being the same, transmits information indicating that the access token is valid to the device.

2. The use right information processing apparatus according to claim 1, further comprising:
   an authentication data generation unit that generates the authentication data on a basis of a request from the user terminal used by the user and transmits the generated authentication data to the user terminal to cause the authentication data to be shared with the user terminal.

3. The use right information processing apparatus according to claim 1, further comprising:
   a determination unit that determines whether or not the user is allowed to use the device on a basis of the information regarding the use right obtained by the acquisition unit.

4. The use right information processing apparatus according to claim 1, wherein
   the predetermined signature algorithm is an elliptic curve digital signature algorithm capable of deriving the public key from the signature data and the authentication data.

5. The use right information processing apparatus according to claim 1, wherein
   the identification information is address information that can be uniquely derived from the public key.

6. The use right information processing apparatus according to claim 1, wherein
   information regarding an available time is recorded as the information regarding the use right of the device in association with the public key or the identification information in the smart contract.

7. The use right information processing apparatus according to claim 1, wherein
   information regarding a number of available times is recorded as the information regarding the use right of the device in association with the public key or the identification information in the smart contract.

8. The use right information processing apparatus according to claim 1, wherein
   the access token is data uniquely generated for each of the processes, and includes information regarding a use period.

9. A use right information processing system comprising:
   the use right information processing apparatus according to claim 1; and
   a user terminal to be used by a user, wherein
   the user terminal is configured to:
   transmit a request for using the device to the use right information processing apparatus on a basis of an instruction from the user; and
   generate signature data by signing authentication data shared with the use right information processing apparatus with an elliptic curve digital signature algorithm using a secret key corresponding to the user, and transmit the generated signature data to the use right information processing apparatus.

10. The use right information processing system according to claim 9, further comprising:
a device to be controlled, wherein
the user terminal is configured to:
receive the access token generated by the token generation unit of the use right information processing apparatus from the use right information processing apparatus; and
receive a control instruction for controlling the device from the user and transmit the control instruction to the device together with the access token received from the use right information processing apparatus, and
the device is configured to:
transmit the access token received from the user terminal to the use right information processing apparatus; and
execute control corresponding to the control instruction in a case of having received information indicating that the access token is valid from the validity confirmation unit of the use right information processing apparatus.

11. A use right information processing method for performing processes related to authentication and authorization for a user to use a device to be controlled using a smart contract that functions with a computer executing a code recorded on a blockchain, the use right information processing method comprising:
a step (a) of storing authentication data shared with a user terminal used by the user and having a different value for each of the processes;
a step (b) of receiving, from the user terminal, signature data generated in the user terminal by signing the authentication data with a predetermined signature algorithm using a secret key corresponding to the user;
a step (c) of deriving, using the predetermined signature algorithm, a public key corresponding to the secret key from the authentication data and the signature data received in the step (b);
a step (d) of obtaining, using the public key or identification information corresponding to the public key, information regarding a use right of the device of the user recorded in advance in association with the public key or the identification information in the smart contract;
a step (e) of generating an access token and transmitting the access token to the user terminal in a case where the user is determined to be allowed to use the device on a basis of the information regarding the use right obtained in the step (d); and
a step (f) of receiving an access token from the device that has received the access token together with a control instruction from the user terminal, determining whether or not the access token received from the device is same as the access token generated in the step (e), and in a case of being the same, transmitting information indicating that the access token is valid to the device.

12. A use right information processing apparatus for performing processes related to authentication and authorization for a user to use a device to be controlled using a smart contract that functions with a computer executing a code recorded on a blockchain, the use right information processing apparatus comprising:
a storage unit that stores authentication data shared with a user terminal used by the user and having a different value for each of the processes;
a receiving unit that receives, from the user terminal, signature data generated in the user terminal by signing the authentication data with a predetermined signature algorithm using a secret key corresponding to the user;
a deriving unit that derives, using the predetermined signature algorithm, a public key corresponding to the secret key from the authentication data and the signature data received by the receiving unit; and
an acquisition unit that obtains, using the public key or identification information corresponding to the public key, information regarding a use right of the device of the user recorded in advance in association with the public key or the identification information in the smart contract, wherein
the receiving unit further receives a control instruction to the device from the user terminal, and
the use right information processing apparatus further comprising a device control unit that transmits the control instruction to the device in a case where the user is determined to be allowed to use the device on a basis of the information regarding the use right obtained by the acquisition unit.

13. A use right information processing method for performing processes related to authentication and authorization for a user to use a device to be controlled using a smart contract that functions with a computer executing a code recorded on a blockchain, the use right information processing method comprising:
a step (a) of storing authentication data shared with a user terminal used by the user and having a different value for each of the processes;
a step (b) of receiving, from the user terminal, signature data generated in the user terminal by signing the authentication data with a predetermined signature algorithm using a secret key corresponding to the user;
a step (c) of deriving, using the predetermined signature algorithm, a public key corresponding to the secret key from the authentication data and the signature data received in the step (b); and
a step (d) of obtaining, using the public key or identification information corresponding to the public key, information regarding a use right of the device of the user recorded in advance in association with the public key or the identification information in the smart contract, wherein
the step (b) further includes a step of receiving a control instruction to the device from the user terminal, and
the use right information processing method further comprising a step (g) of transmitting the control instruction to the device in a case where the user is determined to be allowed to use the device on a basis of the information regarding the use right obtained in the step (d).

* * * * *